W. H. Ward,

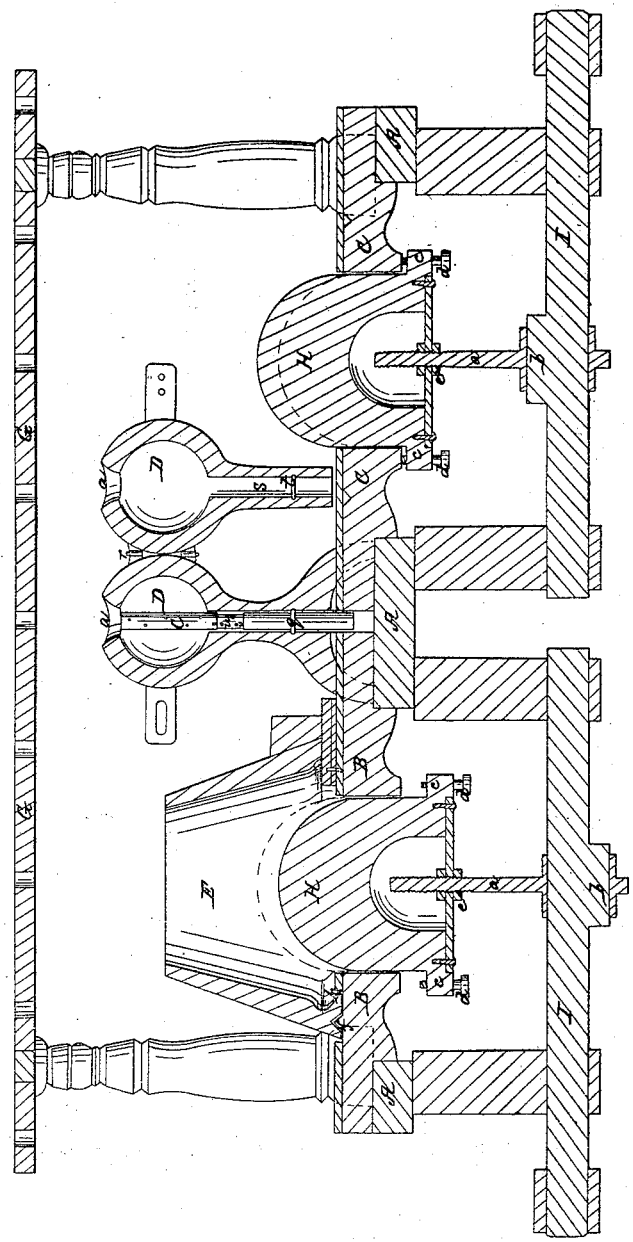

Molding Shot,

Nº 18,782.   Patented Dec. 1, 1857.

UNITED STATES PATENT OFFICE.

W. H. WARD, OF AUBURN, NEW YORK.

IMPROVED MACHINE FOR MOLDING SHELLS.

Specification forming part of Letters Patent No. 18,782, dated December 1, 1857.

*To all whom it may concern:*

Be it known that I, W. H. WARD, of Auburn, in the county of Cayuga and State of New York, have invented certain new and useful Improvements in Shot-Molding Machines, of which the following is a full, clear, and exact description, reference being had to the accompanying drawings, forming part of this specification, in which—

Figure 3:
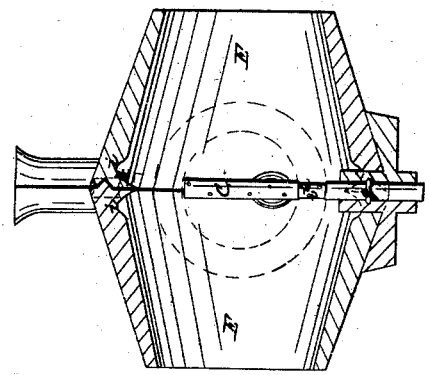
Figure 4:
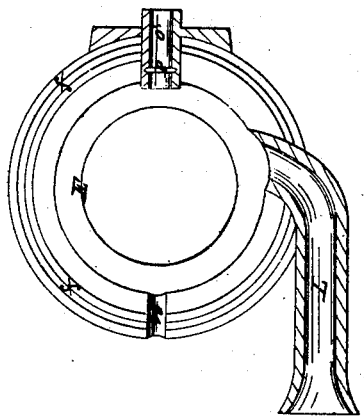
Figure 2:
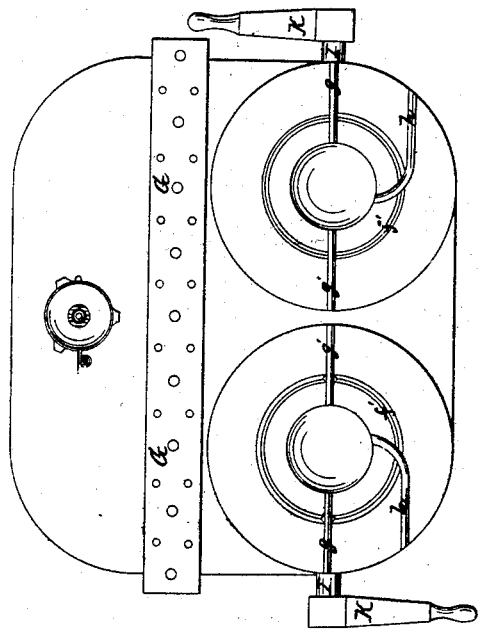

Figure 1 represents a sectional elevation of a shot-molding machine embracing my improvements. Fig. 2 represents a plan of the same. Fig. 3 represents a longitudinal section through the center of the flask, showing the position of the core-pin; and Fig. 4 represents a plan of the under side of the semi-flask.

It has been considered a great desideratum to be able to mold hollow and solid shot accurately by the aid of machinery in order to do away with the slow and expensive process of molding by hand. In those machines constructed for effecting this object, the shot are molded in two parts in what are termed "semi-flasks," and afterward united to form the mold. The core for hollow shot is molded in what is termed a "core-box," and around a straight tubular rod, (generally a piece of gas-pipe,) termed the "core-pin." The core-pin is adjusted to the flask by measuring, and by means of wedges or screws, in order to bring the core exactly in the center of the mold.

These machines consist, mainly, of a molding-table through which protrudes a movable hemispherical pattern. The semi-flasks are placed on this table and adjusted to the pattern by means of pins, which enter holes in the ears of the semi-flask, and the pattern is molded in the usual manner, after which the pattern is lowered, the semi-flask removed, and another substituted in its place. The accuracy of the mold is dependent on the perfect adjustment of the semi-flask to the semi-pattern, to the table, and to each other, and, as the guide-pins are the only devices for making the adjustment, the position of the semi-pattern in the semi-flask is liable to variation, as well as the connection of the semi-flasks with each other. Another objection to these machines, which is also a source of inaccuracy in the molding, is the absence of all means for adjusting the center of the hemispherical pattern to the plane of the molding-table, and however accurately this adjustment is made in constructing the machine it is liable to variation from the springing or wearing of the parts.

The principal object of my improvements is to overcome the before-mentioned defects in shot-molding machines; and my invention for effecting this object consists, first, in adjusting the half-flask to the half-pattern so that the pattern will be exactly in the center of the flask, by means of a circular V-shaped projection or V-recess in the molding-table whose center is the center of the pattern in connection with a circular V-recess or V-projection in the base of the half-flask whose center is also the center of the flask, whereby the mold is formed precisely in the center of each half-flask, so that when the half-flasks are connected the edges of the molds coincide, and thus a perfect spherical mold is formed; second, in adjusting the half-flasks to the molding-table in order to bring the center of the pouring-tube directly over the center of the pattern for molding the gate by means of the circular V-guides on the table and flasks in connection with the semi-cylindrical pattern for the vent and core-stem and the curved transverse recess in the bottom of the flask, whereby the gate is molded exactly in the center of the pouring-tube in each semi-flask, and a perfectly smooth gate is formed when the half-flasks are connected; third, the employment of a series of adjusting-screws passing through the bottom of the pattern for regulating the height of the pattern above the molding-bed, in connection with the adjustable cam-rod for raising the pattern to the height at which it is adjusted; fourth, adjusting the distance the core-pin enters the core-box to a uniform height, so that each successive core will be in the same position on the pin, and also adjusting the position of the core to a uniform height in the flask, so as to be in the center of the mold by means of a projection on the stem of the core-pin, in connection with a corresponding cavity in the core-holder of the core-box and also of the flask, whose distance from the center of the core-box and also from the center of the mold is the same.

The accompanying drawings represent a machine for molding hollow shot, which embraces my improvements. This machine consists of a strongly-framed table, A, which supports on one side two circular iron molding-beds, B C, adapted to hold right and left half-flasks E E', in which the two halves of the shell are molded. On the opposite side of the table is a box, D, in which the cores for the shell are molded, and a stand, G, for holding the cores occupies the space in the center of the table and extends across to each side. A hemispherical pattern, H, for molding the shell protrudes from below through a circular opening in the center of each molding-bed. These patterns are supported by an adjustable eccentric-rod, a, and are raised or lowered by an eccentric, b, on horizontal shafts I, supported in proper bearings beneath the table. These shafts are turned by means of levers K on each side of the table. A projecting flange, c, on the lower end of the pattern is provided with adjusting-screws d, which, when the pattern is raised, come in contact with the under side of the molding-bed and serve to adjust the limit of the upward motion of the pattern, so as to bring the center of hemisphere exactly in the plane of the upper surface of the table. The eccentric-rod is also provided with adjusting-nuts e, to adjust its length, so that the adjusting-screws d on the flange will be brought in contact with the under side of the table by bringing down the lever K. On the upper surface of each bed is a circular V-shaped guide, f, concentric with the pattern, which is elevated on the bed B and depressed on the bed C, and corresponds in reverse with the guides f on the bottom of the right and left half-flasks E E'. Two semi-cylindrical ribs, g g', radiate from opposite sides of the upper surface of the beds, and extend beyond the V-guides. The one, g, is the pattern for molding the vent, and the other, g', the pattern for molding the cavity for a core-pin. A third rib, h, is the pattern for molding the gate in the pouring-tube of the flask. The semi-flasks E E' consist of hollow frustra of cones with a semi pouring-tube, L, joined to their base. The V-shaped guides f in the base of the right and left semi-flasks correspond in reverse, and are turned exactly to fit each other, and also the guides in the molding-bed, so as to form perfect joints when united or when placed on the bed. The base of the semi-flask projects inward beyond the plane of the interior surface, and forms a lip, k, which supports the molding-sand, preventing it from protruding beyond the face of the flask when raised from the bed. Just above the lip is a recess, i, on the interior of the semi-flask, which prevents the molding-sand from receding from the plane of the face of the flask. A recess, m, is also made near the edge of the semi pouring-tube, to retain the sand after the gate is molded. A semi vent-hole, n, is made in one side of the base of each semi-flask, and directly opposite is a semi-cylindrical tube, O', which, when the semi-flasks are connected, forms a holder for retaining the core-pin c in a vertical position.

In the core-pin holder O is a recess, p, for the reception of a flange, q, on the core-pin, by which the height of the core is accurately adjusted, so as to bring it exactly in the center of the mold in that direction, the transverse adjustment being made by the pin accurately fitting the holder. The core-box D is divided through its center and the two parts connected by a hinged joint, r, and supported by a stand. The core-pin c is held in a vertical position and retained in the center of the box by a socket, S, which it accurately fits, made one half in the stand and the other half in the shank extending down from the movable part of the box. A recess, t, in the socket, whose distance from the center of the core-box exactly corresponds with the distance of the recess p from the center of the mold when made in the flask, receives the flange q on the core-pin, and thus regulates the distance the pin enters the core-box and the position of the core on the pin.

The core-pin c consists of a cylindrical tube. The upper part on which the core is formed is bored full of holes, in which supports are driven for holding the core on the pin. A groove, u, is made around the core-pin just below the part occupied by the core for the purpose of retaining a winding of any material to protect this portion of the pin from the melted iron, to allow the pin being wound without increasing the size of the opening in the shell, and also prevent the pin from sticking to the shell. This groove is perforated with small holes, v, to allow air-bubbles to escape that would otherwise injure the shell, forming what are termed "blow-holes" around its mouth. On placing the flasks on the molding-beds, it will be seen that while the V-guide adjusts the center of the flask to the center of the hemispherical pattern, the ribs g g, entering the vent-hole n and the core-pin holder o, adjust the center of the gate-pattern in the center of the molding-tube. The flasks being adjusted to the molding-beds, the pattern is raised to its full height by the side lever, K, and the pattern molded in the usual manner, after which the pattern is lowered and the semi-flasks removed, and another substituted in its place.

In molding the cores the core-pin is adjusted in position in the core-box. The projection on the pin entering the recess in the core-holder regulates its height. The closing of the box retains the pin in a vertical position in the center of the box, and the pin forms a guide which adjusts the edges of the two parts so that they come together with great accuracy.

The sand is introduced into the box through an opening, a', in its top, and the core is molded in the usual manner. The core, after being molded, is taken from the box, and the recess in the core-pin wound with a clayed rag, which is perforated opposite the holes in the recess to allow the air to escape through into the center of the core-pin.

Preparatory to putting the semi-flasks together after the pattern has been molded, the core-pin is placed in the holder $o'$ and the flange adjusted to the recess, thus bringing the center of the core exactly in the center of the mold, after which the semi-flasks are united, which holds the core-pin in place and retains the core immovably in the center of the mold. The core-pin also forms a guide, which adjusts with accuracy the edges of the pouring-tube, so that the edges of the gate-mold coincide. The accuracy with which the semi-flasks fit the beds brings the center of the semi-flask so as to coincide with the center of the pattern and the base of the flask in the plane of the bed. The accuracy of the adjustment of which the patterns are susceptible makes each mold in the semi-flask a perfect hemisphere, and the perfection of the joints between the two semi-flasks causes the edges of the half-patterns to coincide, by which means a perfect spherical pattern is formed in the flask.

The great advantages of this shot-molding machine over those heretofore constructed are the rapidity and perfect accuracy with which the shot can be molded by it, thereby enabling me at less cost to produce a more perfect and better article.

This machine is equally well adapted to molding both hollow and solid shot.

Having thus described my improvements in shot-molding machines, what I claim therein as new, and desire to secure by Letters Patent, is—

1. Of adjusting the semi-flasks to the pattern, to the molding-bed, and to each other by means of circular V-shaped guides constructed and arranged as described.

2. The combination of the V-guides with the ribs $g$ $g'$ and the recesses $n$ $o'$ in the base of the flask, for adjusting the pouring-tube to the gate-pattern.

3. The combination of the adjusting-screws $d$ in the base of the pattern with the adjustable eccentric-rod, arranged, as described, for adjusting and raising the pattern so that its center will coincide with the plane of the molding-plate.

4. The combination of the core-pin and adjusting-flange $e$ with the core-pin holder and adjusting-recess, the whole arranged in the manner and for the purpose set forth.

In testimony whereof I have subscribed my name.

W. H. WARD.

Witnesses:
J. S. GRAY,
HORACE T. COOK.